United States Patent [19]

Ishida et al.

[11] Patent Number: 5,292,789
[45] Date of Patent: Mar. 8, 1994

[54] POLYPHENYLENE SULFIDE RESIN COMPOSITION

[75] Inventors: Hiromi Ishida; Hidekazu Kabaya, both of Moka, Japan

[73] Assignee: GE Plastics Japan, Ltd., Japan

[21] Appl. No.: 883,520

[22] Filed: May 15, 1992

[30] Foreign Application Priority Data

May 16, 1991 [JP] Japan .................... 3-139549

[51] Int. Cl.$^5$ .................... C08K 5/13; C08L 53/00
[52] U.S. Cl. .................... 524/320; 524/321; 524/505; 525/92; 525/98; 525/133; 525/179; 525/189
[58] Field of Search .................... 525/92, 98, 133, 179, 525/189; 524/320, 321, 505

*Primary Examiner*—John C. Bleutge
*Assistant Examiner*—Helen F. Lee

[57] ABSTRACT

A polyphenylene sulfide/polyphenylene ether composition is provided, which has excellent dimensional stability and impact resistance, as well as good heat resistance, rigidity and surface appearance. The composition also includes certain polyamide resins, hydrogenated conjugated diene/aromatic monovinyl block copolymers, modified polyolefins, compatibilizer agents, and inorganic fillers.

5 Claims, No Drawings

POLYPHENYLENE SULFIDE RESIN COMPOSITION

FIELD OF THE INVENTION

The present invention relates to a polyphenylene sulfide (hereinafter referred to as "PPS") resin composition.

BACKGROUND

PPS resin has good resistance to heat, flame and chemicals, and has high rigidity. It is a very useful engineering plastic. However, it has a drawback: low impact resistance. Accordingly, resin compositions which exhibit the excellent properties of PPS while minimizing its drawbacks have been proposed in the past.

For instance, Japanese Patent Application Laid-Open No. 156561/75 discloses a resin composition comprising polyphenylene ether (hereinafter referred to as PPE) and PPS in which PPS is added to improve moldability and fire-resistance of PPE.

Japanese Patent Application Laid-Open No. 69255/78 discloses a polyphenylene ether resin composition containing PPS and polyamide. This intends to improve brittleness of PPS.

Further, Japanese Patent Application Laid-Open No. 213758/84 proposes a resin composition in which a polyamide resin and an epoxy resin are admixed to a blend of PPS and PPE in order to improve compatibility between PPS and PPE.

In the case where PPE and polyamide are blended with PPS to improve the brittleness of PPS as mentioned above, the simply-mixed resins are brittle and the surface appearance is not excellent because PPS and PPE are intrinsically incompatible with each other. In the case where the compatibility between PPS and PPE is improved by adding polyamide and an epoxy resin, the epoxy reacts with polyamide and PPS, which results in a problem of unstable melt flow properties. Also, when polyamide is admixed with PPS, compatibility between PPS and polyamide is insufficient, so that improvement of the brittleness of PPS is insufficient and, moreover, a new problem, delamination, takes place.

In the above circumstances, the present inventors disclosed, in Japanese Patent Application Laid-Open 20355/91, that a certain type of compound such as citric acid is added to a PPS/PPE/polyamide system to thereby specify the dispersion state of each resin and, accordingly, it is possible to improve the surface appearance, brittleness and heat resistance of a PPS resin composition.

Meanwhile, the present inventors also disclosed, in Japanese Patent Application Laid-Open 20356/91, that the brittleness to impact is improved by adding an unsaturated monomer and/or a polymer, each having an epoxy and/or oxazolinyl group to a PPS/PPE resin composition.

PROBLEMS TO BE SOLVED BY THE INVENTION

The purpose of the present invention is to provide a PPS/PPE/polyamide resin compositions which particularly has excellent dimensional stability and impact resistance, as well as good heat resistance and surface appearance.

The present invention provides a polyphenylene sulfide resin composition comprising
- (A) 36 to 59 parts by weight of polyphenylene sulfide,
- (B) 6 to 19 parts by weight of polyphenylene ether,
- (C) 11 to 29 parts by weight of polyamide,
- (D) 11 to 24 parts by weight of a hydrogenated conjugated diene compound/aromatic monovinyl compound block copolymer, and
- (E) 1 to 14 parts by weight of modified polyolefine having at least one functional group selected from the group consisting of carboxylic acid groups and acid anhydride groups, and further comprising, per 100 parts by weight of said A, B, C, D and E in total,
- (F) 0.01 to 10 parts by weight of a compatibilizer, and
- (G) at least 0.1 part by weight and less than 5 parts by weight of a particulate or laminar inorganic filler, characterized in that said polyamide (C) is a copolymer of nylon-6 and nylon-12, and that the polyphenylene sulfide forms a continuous phase, the polyamide disperses in said continuous phase, and the polyphenylene ether and a most part of said inorganic filler disperse in said polyamide dispersion phase.

The PPS used in the invention contains preferably at least 70 mole % of a structural unit represented by the general formula ——S—, wherein represents a phenylene group, because it gives excellent properties to the composition. Methods of the polymerization for PPS include a method where p-dichlorobenzene is polymerized in the presence of sulfur and sodium carbonate, a method where polymerization is carried out in a polar solvent in the presence of sodium sulfide or sodium hydrosulfide and sodium hydroxide, or hydrogen sulfide and sodium hydroxide and a method where p-chlorothiophenol is self-condensed. Preferred is a method where sodium sulfide is reacted with p-dichlorobenzene in an amide type solvent such as N-methyl pyrrolidone and dimethyl acetamide or a sulfone type solvent such as sulfolane. In these, it is preferred to add an alkali metal salt of carboxylic acid or sulfonic acid or alkali metal hydroxide in order to regulate a polymerization degree. As copolymerizable components, a meta bond

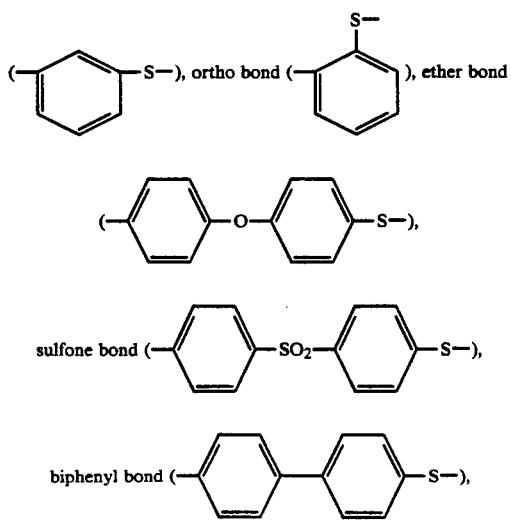

substituted phenyl sulfide bond (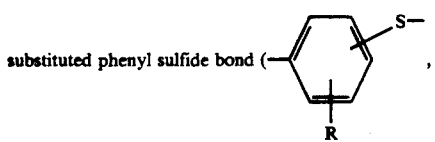, wherein R represents alkyl, nitro, phenyl, alkoxy, carboxylic acid or its metal salt group) and trifunctional phenyl sulfide bond

may be incorporated in an amount of less than 30 mole % as far as crystallinity of the polymer is not greatly affected. However, the amount of the copolymerized components is preferably 10 mole % at most. Particularly when tri- or more functional phenyl, biphenyl or naphthyl sulfide bond is selected as the copolymerizable component, 3 mole % or less is preferred with 1 mole % or less being more preferred.

Such PPS may be synthesized in a usual preparation process, such as (1) reaction of a hologen substituted aromatic compound with alkali sulfide (U.S. Pat. No. 2,513,188, Japanese Patent Publications 27671/69 and 3368/70), (2) condensation reaction of thiophenols in the coexistence of alkali catalysts or copper salts (U.S. Pat. No. 3,274,165, U.K. Patent 1,160,660) and (3) condensation reaction of aromatic compounds in the coexistence of sulfur chloride and a Lewis acid catalyst (Japanese Patent Publication 27255/71, Belgian Patent 29437). These may be selected depending upon purposes.

PPS is now commercially available from Philips Petroleum Co., Toso Sasteel Co., Topren Co. and Kureha Kagaku Co. There are various grades having different crosslinking densities and viscosities. PPS having less cross-linked structure is preferred in the present invention.

PPE as component (B) is a generic name of polymers represented, for example, by the general formula (A):

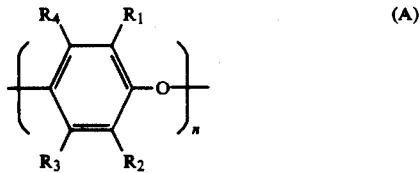

wherein $R_1$, $R_2$, $R_3$ and $R_4$ are a monovalent substituent selected form a hydrogen atom, a halogen atom, an alkyl group, an alkoxy group, a haloalkyl or haloalkoxy group in which at least 2 carbon atoms are present between a halogen atom and a phenyl ring with the exclusion of those having a tertiary alpha-carbon atom and n is an integer representing a degree of polymerization. The polymer may be a homopolymer or a copolymer of two or more comonomers represented by the above general formula. In preferred examples, $R_1$ and $R_2$ are an alkyl group of 1 to 4 carbon atoms, and $R_3$ and $R_4$ are a hydrogen atom or an alkyl group of 1 to 4 carbon atoms. For instance, there can be named poly(2,6-dimethyl-1,4-phenylene)ether, poly(2,6-diethyl-1,4-phenylene)ether, poly(2-methyl-6-ethyl-1,4-phenylene)ether, poly(2-methyl-6-propyl-1,4-phenylene)ether, poly(2,6-dipropyl-1,4-phenylene)ether and poly(2-ethyl-6-propyl-1,4-phenylene)ether. The polyphenylene ether copolymer includes a copolymer in which a part of the aforesaid polyphenylene ether recurring unit is replaced with alkyl-trisubstituted phenol, such as 2,3,6-trimethylphenol. Further, styrene type compounds may be grafted on these PPE to yield copolymers. Examples of the styrene type compound-grafted polyphenylene ethers are copolymers which are obtained by grafting a styrene type compound, for example, styrene, alpha-methyl styrene, vinyl toluene and chlorostyrene on the aforesaid PPE.

Component (C), polyamide, used in the invention is a copolymer of nylon-6 and nylon-12. By the terms "a copolymer of nylon-6 and nylon-12" used herein is meant a copolymer prepared from epsilon-caprolactum with omega-laurolactum or 12-aminododecanoic acid, which may be a block or random copolymer. The copolymerization ratio is preferably 0.02 to 50 moles of nylon-12 per mole of nylon-6.

Component (D) in the present composition is a hydrogenated conjugated diene compound/aromatic monovinyl compound block copolymer. The hydrogenated block copolymer may be obtained by hydrogenating a conjugated diene compound/aromatic monovinyl compound block copolymer. As the conjugated diene compound/aromatic monovinyl compound block copolymer to be hydrogenated, any ones which are prepared in known processes may be used, such as those described in U.S. Pat. Nos. 3,595,942; 3,639,517; and 4,091,053. The conjugated diene compound/aromatic monovinyl compound block copolymer is usually prepared by successive polymerization of 10 to 90% by weight of a conjugated diene compound and 90 to 10% by weight of an aromatic monovinyl compound, where molecular weight distribution and branched conditions of a resulting block copolymer may be properly controlled by multiple addition of a polymerization initiator or an aromatic monovinyl compound or subsequent treatment with a multi-functional monomer.

Examples of the conjugated diene compound used as a starting monomer include butadiene, isoprene and chloroprene. Butadiene and isoprene are preferred. These conjugated diene compounds may be used alone or in combination of the two or more. Meanwhile, examples of the aromatic monovinyl compound include styrene, α-methyl styrene, p-methyl styrene, p-tert.-butyl styrene, p-chloro styrene, p-bromo styrene and vinyl naphthalene. Styrene is particularly preferred. These aromatic monovinyl compounds may be used alone or in combination of the two or more.

Preferred conjugated diene compound/aromatic monovinyl compound block copolymers are isoprene/styrene block copolymers and butadiene/styrene block copolymers in which styrene is incorporated in an amount, for instance, up to 45% by weight, preferably from 10 to 40% by weight.

For component (D), hydrogenated conjugated diene compound/aromatic monovinyl compound block copolymer, in the invention, use is preferably made of ones which are obtained by hydrogenating the aforesaid conjugated diene compound/aromatic monovinyl compound block copolymer to such an extent that at least 80%, preferably at least 85%, of the double bonds of the conjugated diene compound units is hydrogenated and 25% or less of the double bonds of the aromatic monovinyl compound units is hydrogenated. Particularly preferred is one in which a hydrogenation ratio of the double bonds of the conjugated diene compound units is about 99% and a hydrogenation ratio of the double bonds of the aromatic monovinyl compound units is less than 5%.

Average molecular weight of the hydrogenated conjugated diene compound/aromatic monovinyl compound block copolymer is preferably in a range of 25,000 to 350,000, more preferably 35,000 to 300,000. It may have functional groups such as anhydride groups or epoxy groups on its main chain or side chain or at its terminals.

Component (E), modified polyolefine, used in the invention is polyolefine having at least one functional group selected from the group consisting of carboxylic acid groups and acid anhydride groups. Examples of it include copolymers of olefine monomers with unsaturated carboxylic acids, such as ethylene/acrylic acid copolymers, ethylene/methacrylic acid copolymers and ethylene/fumaric acid copolymers; copolymers of olefine monomers with vinyl monomers having a carboxylic acid group or acid anhydride group, such as ethylene/ethyl acrylate/acrylic acid copolymers, ethylene/maleic anhydride copolymers and ethylene/propylene/maleic anhydride copolymers; polyolefines graft-modified with vinyl monomers having a carboxylic acid group or acid anhydride group, such as ethylene-g-maleic anhydride copolymers, (where -g- means "grafted with", hereinafter the same), ethylene/propylene-g-maleic anhydride copolymers, ethylene/propylene-g-acrylic acid copolymers, ethylene/1-butene-g-maleic anhydride copolymers, ethylene/1-butene-g-fumaric acid copolymers, ethylene/1-hexene-g-itaconic acid copolymers, ethylene/propylene/1,4-hexadiene-g-maleic anhydride copolymers, ethylene/propylene/dicyclopentadiene-g-maleic anhydride copolymers, ethylene/propylene/dicyclopentadiene-g-fumaric acid copolymers, ethylene/propylene/5-ethylidene-2-norbornene-g-maleic anhydride copolymers, ethylene/propylene/5-ethylidene-2-norbornen-g-maleic acid copolymers and ethylene/vinyl acetate-g-acrylic acid copolymers. Among these, preferred is polyolefine graft-modified with a vinyl monomer having a carboxylic acid or acid anhydride group. Two or more of these modified polyolefines may be used in combination.

Component (E), modified polyolefine, may be usually prepared in any known processes as described in Japanese Patent Publication Nos. 8299/84 and 9925/81.

The resin composition according to the invention preferably contains components A, B, C, D and E in the following ratios: A, 36 to 59 parts by weight, particularly 40 to 55 parts by weight; B, 6 to 19 parts by weight, particularly 8 to 17 parts by weight; C, 11 to 29 parts by weight, particularly 15 to 25 parts by weight; D, 11 to 24 parts by weight, particularly 12 to 20 parts by weight; and E, 1 to 14 parts by weight, particularly 3 to 9 parts by weight. If A is less than 36 parts by weight, rigidity is low and surface appearance of a molded article is poor, while impact resistance is low with more than 59 parts by weight of A. If B is less than 6 parts by weight, dimensional stability is low and surface appearance of a molded article is poor, while impact resistance is low with more than 19 parts by weight of B. If C is less than 11 parts by weight, impact resistance is low, while water absorption becomes larger with more than 29 parts by weight of C. If D is less than 11 parts by weight or E is less than 1 part by weight, impact resistance is low. Meanwhile, if D exceeds 24 parts by weight or E exceeds 14 parts by weight, rigidity and heat resistance are poor and surface appearance of a molded article is also poor.

In the invention, component F, compatibilizer, is further incorporated in addition to the aforesaid components. For the compatibilizer, any compatibilizers known for PPS, PPE and polyamide may be used. Preferred examples of such compatibilizers include (a) citric acid, malic acid, agaricic acid and derivatives thereof, (b) compounds having, in a molecule, (i) a carbon-carbon double or triple bond, and (ii) a carboxylic acid, acid anhydride, acid amide, imide, carboxylate, epoxy, amino or hydroxyl group, and (c) compounds having a carboxyl or acid anhydride group and an acid halide group.

The aforesaid (a), citric acid, malic acid, agaricic acid and derivatives thereof, are described in Published Japanese Translation of PCT Patent Application No. 502195/86. Although the compounds which are indicated in a general formula in that publication may be used in the invention, the aforementioned compounds are especially preferred. The derivatives include esters, amides, anhydrides, hydrates and salts. Examples of the acid esters include acetyl citrate and mono- or di-stearyl citrates. Examples of the acid amide include N,N'-diethyl amide, N,N'-dipropyl amide, N-phenyl amide, N-dodecyl amide and N,N'-didodecyl amide of citric acid, and N-dodecyl amide of malic acid. Examples of the salts include calcium malate, calcium citrate, potassium malate and potassium citrate.

The aforesaid compounds (b) are described in Japanese Patent Application Laid-Open 49753/81. Examples of such include maleic anhydride, maleic acid, fumaric acid, maleimide, maleic hydrazide, reaction products of maleic anhydride with diamines, such as those having the structures:

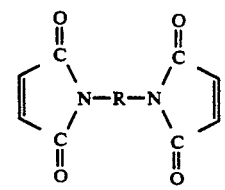

or

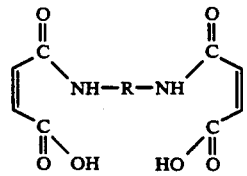

(wherein R represents an aliphatic or aromatic group), methylnadic anhydride, dichloromaleic anhydride, maleic acid amide; natural oils and fats such as soybean oil, tung oil, castor oil, linseed oil, hempseed oil, cottonseed oil, sesami oil, rapeseed oil, peanut oil, tsubaki oil, olive oil, coconut oil, and sardine oil; epoxidated natural oils and fats such as epoxidated soybean oil; unsaturated carboxylic acid such as acrylic acid, butenoic acid, crotonic acid, vinyl acetic acid, methacrylic acid, pentenoic acid, angelic acid, tiglic acid, 2-pentenoic acid, 3-pentenoic acid, α-ethyl acrylic acid, β-methyl crotonic acid, 4-pentenoic acid, 2-hexenoic acid, 2-methyl-2-pentenoic acid, 3-methyl-2-pentenoic acid, α-ethyl crotonic acid, 2,2-dimethyl-3-butenoic acid, 2-heptenoic acid, 2-octenoic acid, 4-decenoic acid, 9-undecenoic acid, 10-undecenoic acid, 4-dodecenoic acid, 5-dodecenoic acid, 4-tetradecenoic acid, 9-tetradecenoic acid, 9-hexadecenoic acid, 2-octadecenoic acid, 9-octadecenoic acid, eicosenoic acid, docosenoic acid, erucic acid, tetracosenoic acid, mycolipenoic acid, 2,4-pentadienoic acid, 2,4-hexadienoic acid, diallylacetic acid, genaric acid, 2,4-decadienoic acid, 2,4-dodecadienoic acid, 9,12-hexadecadienoic acid, 9,12-octadecadienoic acid, hexadecatrienoic acid, linolic acid, linolenic acid, octadecatrienoic acid, eicosadienoic acid, eicosatrienoic acid, eicosatetraenoic acid, recinoleic acid, eleostearic acid, oleic acid, eicosapentaenoic acid, erucic acid, docosadienoic acid, docosatrienoic acid, docosatetraenoic acid, docosapentaenoic acid, tetracosenoic acid, hexacosenoic acid, hexacodienoic acid, octacosenoic acid and tolaacontenoic acid, or esters, acid acid amides or anhydrides of these unsaturated carboxylic acid; unsaturated alcohols such as allyl alcohol, crotyl alcohol, methyl vinyl carbinol, allyl carbinol, methyl propenyl carbinol, 4-pentene-1-ol, 10-undecene-1-ol, propargly alcohol, 1,4-pentadiene-3-ol, 1,4-hexadiene-3-ol, 3,5-hexadiene-2-ol, 2,4-hexadiene-1-ol, alcohols represented by the general formulae $C_nH_{2n-5}OH$, $C_nH_{2n-7}OH$ or $C_nH_{2n-9}OH$ with n being a positive integer, 3-butene-1,2-diol, 2,5-dimethyl-3-hexene-2,5-diol, 1,5-hexadiene-3,4-diol, and 2,6-octadiene-4,5-diol; unsaturated amines where the OH group in the aforesaid unsaturated alcohols is replaced with an amino group; addition products of maleic anhydride or phenols to low molecular weight polymers (e.g., those with average molecular weight of 500 to 10000) or high molecular weight polymers (e.g., those with average molecular weight above 10000) of butadiene, isoprene or the like, or these polymers in which an amino, carboxylic acid, hydroxyl or epoxy group is introduced. Compounds which have two or more, same or different functional groups selected from group (i) and two or more, same or different functional groups selected from the group (ii) are also included in component (b).

As compound (c), particularly named is trimellitic acid anhydride chloride, which is described in Published Japanese Translation of PCT Patent Application No. 50056/87.

Another example of component (F), compatibilizer, is an unsaturated monomer and/or a polymer each having an epoxy group and/or oxazolinyl group.

Example of the unsaturated monomers having an epoxy group or oxazolinyl group include the following ones. Preferred unsaturated monomers with an epoxy group include glycidyl methacrylate (hereinafter, GMA), glycidyl acrylate, vinyl glycidyl ether, glycidyl ether of hydroxyalkyl (meth)acrylate, glycidyl ether of polyalkyleneglycol (meth)acrylate and glycidyl itaconate.

Preferred unsaturated monomers with an oxazolinyl group include those represented by the general formula:

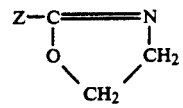

wherein Z is a substituent having a polymerizable double bond. Preferred substituent Z includes:

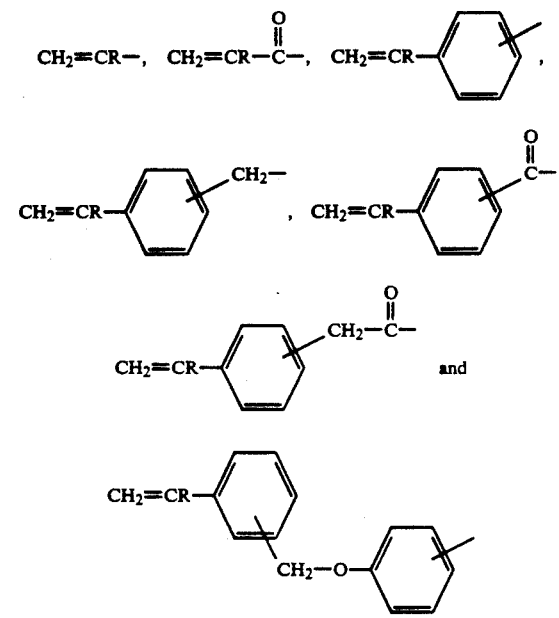

In these formulae, R is a hydrogen atom or an alkyl or alkoxy group having 1 to 6 carbon atoms, such as methyl group, i- or n-propyl or butyl group.

A particularly preferred compound is vinyl oxazoline represented by the general formula:

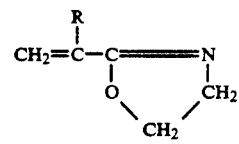

wherein R has the aforesaid meaning and is preferably a hydrogen atom or methyl group.

Polymers with an epoxy group or oxazolinyl group include homopolymers of the aforesaid unsaturated monomers, copolymers composed of two or more of the aforesaid unsaturated monomers, and copolymers composed of one or more of the aforesaid unsaturated monomers with other unsaturated monomer(s). The other unsaturated monomers include aromatic vinyl monomers such as styrene (hereinafter St); vinyl cyanide monomers such as acrylonitrile; vinyl acetate; unsaturated carboxylic acids or derivatives thereof such as acrylic acid and salts thereof, methacrylic acid and salts thereof, acrylic esters, methacrylic esters, maleic acid and its anhydride, maleic esters and 2-norbornene-5,6-dicarboxylic acid and its anhydride; alpha-olefines such as ethylene, propylene, 1-butene, 1-pentene, 4-methyl-1-pentene, 1-hexene, 1-octene, 1-decene, 1-tetradecene, 1-hexadecene, 1-octadecene and 1-eicosen; dienes such as butadiene, isoprene, 1,4-hexadiene, 5-ethylidene-2-norbornen and 5-vinyl-2-norbornen.

Examples of the copolymers are GMA/St, GMA/St/MMA(methyl methacrylate)/MA, GMA/St/acrylonitrile, GMA/MMA/acrylonitrile, GMA/MMA, GMA/MMA/St, vinyl oxazoline/St, vinyl oxazoline/MMA, ethylene/GMA, and ethylene/vinyl acetate/GMA. Copolymers other than the aforesaid ones may also be used as a matter of course.

The aforesaid component (F), compatibilizer, is generally used in an amount of 0.01 to 10 parts by weight, preferably 0.1 to 3 parts by weight, per 100 parts by weight of the total of (A) PPS, (B) PPE, (C) polyamide, (D) hydrogenated conjugated diene compound/aromatic monovinyl compound block copolymer and (E) modified polyolefine. If it is less than the above limit, the envisaged effect is small. On the other hand, if it is more than the above limit, heat resistance of a molded article decreases greatly.

The present resin composition further contains (G) particulate or laminar inorganic filler. Examples of such an inorganic filler include talc, clay, mica, glass flakes, glass beads, glass balloons and calcium carbonate. The inorganic filler is incorporated in an amount of at least 0.1 part by weight and less than 5 parts by weight per 100 parts by weight of the total of components A, B, C, D and E. If the amount of the inorganic filler is less than 0.1 part by weight, dimensional stability is poor. Meanwhile, if it is 5 parts by weight or more, impact resistance is low and surface appearance of a molded article is poor.

To the resin composition according to the invention may be further added other resins, and additives such as pigments, dyes, heat resisting agents, antioxidants, anti-weathering agents, lubricants, releasing agents, nucleating agents, plasticizers, flow-improving agents and antistatics in a mixing process or molding process of the resins, as far as the physical properties are not damaged.

In the resin composition of the invention, the polyphenylene sulfide forms a continuous phase, the polyamide disperses in this continuous phase, and the polyphenylene ether disperses in the polyamide dispersion phase. In addition, a most part of the inorganic filler disperses in the polyamide dispersion phase, too. In most cases, the polyamide dispersion phase takes a relatively large, irregular form, in which one or, usually, plural small polyphenylene ether spheres are contained. The hydrogenated conjugated diene compound/aromatic monovinyl compound block copolymer is contained substantially in the polyphenylene ether dispersion phase. This morphology has been confirmed by observation with a transmission type electron microscope (TEM).

A melt kneading process is preferred to prepare the resin composition of the present invention. It is allowed to use small amounts of solvents, but this is not needed usually. As equipment to be used, extruders, banbury mixers, rollers and kneaders may be named in particular. These may be operated batchwise or continuously.

EXAMPLES

The present invention will be further explained in the following Examples. The amount of each component will be indicated in part by weight.

EXAMPLES 1 AND 2 AND COMPARISON EXAMPLES 1 TO 14

As component A, Topren T4 (trade mark, Topren Co.) was used.

As component B, poly (2,6-dimethyl-1,4-phenylene) ether with an intrinsic viscosity of 0.46 dl/g (in chloroform, 30° C.) was used.

As component C, a copolymer of nylon-6 and nylon-12 (polymerization mole ratio, 80:20; trade mark, 7024B; Ube Kosan Co.) was used.

As component D, Kraton G1651 (trade mark, partly hydrogenated styrene-butadiene block copolymer (SEBS), Shell Chemical Co.) was used.

As component E, Bondine FX8000 (trade mark, Sumika CDF Chemical Ltd.) was used.

As component F, citric acid was used.

As component G, LMS200 (laminar talc, Fuji Talc Co.) was used.

Components B, C, D and F were mixed together in the amounts (part by weight) indicated in Table 1, and pre-extruded into pellets using a twin screw extruder (screw diameter, 50 mm) set at 300° C.

Then, the pellets were mixed with the remaining components indicated in Table 1 in the amounts (part by weight) indicated in Table 1 and again extruded into pellets in the same conditions as in the aforesaid pre-extrusion. After dried, the pellets were molded into test pieces using an injection molding machine set at the cylinder temperature of 300° C. The test pieces were subjected to various tests. The results are as shown in Table 1.

The evaluation tests were conducted as follows:

Bending strength and bending modulus, determined according to ASTM D 790.

Heat distortion temperature (HDT), determined according to ASTM D 648 at a load of 4.6 kg on a specimen of ⅛ inch.

Coefficient of linear expansion, determined at −30° C. to 80° C. with TMA available from Seiko Electronic Industries Co.) on a specimen annealed at 150° C. for one hour.

Falling ball impact test, conducted at room temperature using a falling ball impact tester with a hammer diameter of 12.7 mm, a diameter of an under hole of 31.7 mm and a hammer weight of 3.6 kg.

Water absorption, represented by weight increase (%) after dipping a test piece in water at 40° C. for 14 days.

Surface appearance, evaluated by observation with the naked eye on a molded test piece of 15 cm×15 cm.

Further, the resin composition of Example 1 was observed with a transmission type electron microscope (TEM) to see the morphology of the components. FIG. 1 is the electronmicroscopic photograph.

As seen from FIG. 1, the PPS formed a continuous phase. In this continuous phase, the polyamide dispersed to form an irregular dispersion phase, in which polyamide phase the PPE and the inorganic filler dispersed.

EXAMPLE 3

With the exception that Ryton M2588 (trade mark, Toray Philips Petroleum Co.) was used as component A, the procedure of Example 1 was repeated to conduct pre-extrusion, extrusion and, then, injection molding to thereby prepare test pieces, which were subjected to the various tests. The results are as shown in Table 1.

EXAMPLE 4

With the exception that Septon 2006 (trade mark, partly hydrogenated styrene-propylene block copolymer, i.e., SEPS, Kurare Co.) was used as component D, the procedure of Example 1 was repeated to conduct pre-extrusion, extrusion and, then, injection molding to thereby prepare test pieces, which were subjected to the various test. The results are as shown in Table 1.

EXAMPLE 5

With the exception that Tafmer MP0610 (trade mark, acid-modified ethylene-propylene rubber, Mitsui Petrochemical Co.) was used as component E, the procedure of Example 1 was repeated to conduct pre-extrusion, extrusion and, then, injection molding to thereby prepare test pieces, which were subjected to the various tests. The results are as shown in Table 1.

EXAMPLE 6

With the exception that maleic anhydride was used as component F, the procedure of Example 1 was repeated to conduct pre-extrusion, extrusion and, then, injection molding to thereby prepare test pieces, which were subjected to the various tests. The results are as shown in Table 1.

EXAMPLE 7

With the exception that calcined clay was used as component G, the procedure of Example 1 was repeated to conduct pre-extrusion, extrusion and, then, injection molding to thereby prepare test pieces, which were subjected to the various tests. The results are as shown in Table 1.

(E) 1 to 14 parts by weight of modified polyolefine having at least one functional group selected from the group consisting of carboxylic acid groups and acid anhydride groups, and further comprising, per 100 parts by weight of said A, B, C, D and E in total, (F) 0.01 to 10 parts by weight of a compatibilizer, and (G) at least 0.1 part by weight and less than 5 parts by weight of a particulate or laminar inorganic filler, characterized in that said polyamide (C) is a copolymer of nylon-6 and nylon-12, and that the polyphenylene sulfide forms a continuous phase, the polyamide disperses in said continuous phase, and the polyphenylene ether and a most part of said inorganic filler disperse in said polyamide dispersion phase.

2. The resin composition described in claim 1, wherein said compatibilizer (F) is at least one compound selected from (a) citric acid, malic acid, agaricic acid and derivatives thereof, (b) compounds having, in a molecule, (i) a carbon-carbon double or triple bond, and (ii) a carboxylic acid, acid anhydride, acid amide, imide, carboxylate, epoxy, amino or hydroxyl group, and (c) compounds having a carboxyl or acid anhydride group and an acid halide group.

3. The resin composition described in claim 1, wherein said compatibilizer (F) is selected from the group consisting of malic acid and citric acid.

TABLE 1

| | Component, part by weight | | | | | | | Test Results | | | | | |
|---|---|---|---|---|---|---|---|---|---|---|---|---|---|
| | (A) | (B) | (C) | (D) | (E) | (F) | (G) | Bending Strength (Kg/cm$^2$) | Bending Modulus (Kg/cm$^2$) | HDT (°C.) | Linear expansion coef. ($\times 10^{-5}$) | Falling ball impact strength (Kg·cm) | Water absorption (%) | Surface appearance |
| Comp. | | | | | | | | | | | | | | |
| 1 | 60 | 8 | 16 | 12 | 4 | 0.35 | 4 | 640 | 18,800 | 173 | 7.1 | 100 | 0.5 | ○ |
| 2 | 35 | 14 | 25 | 20 | 6 | 0.35 | 4 | 480 | 13,300 | 168 | 7.8 | >350 | 1.1 | X |
| 3 | 42 | 20 | 19 | 14 | 5 | 0.35 | 4 | 590 | 17,300 | 183 | 7.5 | 25 | 0.7 | ○ |
| 4 | 50 | 5 | 23 | 17 | 5 | 0.35 | 4 | 530 | 14,900 | 174 | 8.2 | >350 | 0.9 | X |
| 5 | 42 | 10 | 30 | 14 | 4 | 0.35 | 4 | 620 | 16,900 | 175 | 7.9 | >350 | 2.0 | ○ |
| 6 | 53 | 13 | 10 | 18 | 6 | 0.35 | 4 | 520 | 15,200 | 179 | 7.3 | 25 | 0.3 | ○ |
| 7 | 43 | 10 | 18 | 25 | 4 | 0.35 | 4 | 450 | 12,900 | 150 | 8.0 | 300 | 0.6 | X |
| 8 | 50 | 12 | 23 | 10 | 5 | 0.35 | 4 | 690 | 18,100 | 183 | 7.2 | 75 | 0.9 | ○ |
| 9 | 43 | 10 | 18 | 14 | 15 | 0.35 | 4 | 440 | 11,700 | 128 | 8.0 | 250 | 0.6 | X |
| 10 | 49 | 12 | 22 | 17 | 0 | 0.35 | 4 | 660 | 20,100 | 174 | 7.3 | 75 | 0.8 | ○ |
| 11 | 47 | 11 | 21 | 16 | 5 | 0 | 4 | 650 | 17,200 | 170 | 7.7 | 25 | 0.8 | X |
| 12 | 47 | 11 | 21 | 16 | 5 | 0.35 | 15 | 620 | 21,400 | 179 | 6.5 | 100 | 0.7 | X |
| 13 | 47 | 11 | 21 | 16 | 5 | 0.35 | 8 | 590 | 18,400 | 173 | 7.1 | 75 | 0.7 | X |
| 14 | 47 | 11 | 21 | 16 | 5 | 0.35 | 0 | 600 | 15,100 | 177 | 8.2 | >350 | 0.7 | ○ |
| Ex. | | | | | | | | | | | | | | |
| 1 | 47 | 11 | 21 | 16 | 5 | 0.35 | 4.8 | 670 | 18,200 | 173 | 7.7 | >350 | 0.7 | ○ |
| 2 | 47 | 11 | 21 | 16 | 5 | 0.35 | 2.4 | 660 | 17,600 | 174 | 7.9 | >350 | 0.7 | ○ |
| 3 | 47 | 11 | 21 | 16 | 5 | 0.35 | 4 | 670 | 18,600 | 171 | 7.7 | >350 | 0.7 | ○ |
| 4 | 47 | 11 | 21 | 16 | 5 | 0.35 | 4 | 580 | 16,500 | 160 | 7.7 | >350 | 0.7 | ○ |
| 5 | 47 | 11 | 21 | 16 | 5 | 0.35 | 4 | 660 | 17,900 | 172 | 7.7 | >350 | 0.7 | ○ |
| 6 | 47 | 11 | 21 | 16 | 5 | 0.25 | 4 | 630 | 17,900 | 176 | 7.7 | >350 | 0.7 | ○ |
| 7 | 47 | 11 | 21 | 16 | 5 | 0.35 | 2.4 | 620 | 16,000 | 179 | 7.9 | 300 | 0.7 | ○ |

The present invention provides a resin composition comprising PPS/PPE/polyamide, which has excellent dimensional stability and impact resistance as well as good heat resistance, rigidity and surface appearance. Thus, the resin composition of the invention is commercially useful.

We claim:

1. A polyphenylene sulfide resin composition comprising (A) 35 to 59 parts by weight of polyphenylene sulfide,
(B) 6 to 19 parts by weight of polyphenylene ether,
(C) 11 to 29 parts by weight of polyamide,
(D) 11 to 24 parts by weight of a hydrogenated conjugated diene compound/aromatic monovinyl compound block copolymer, and 4. The polyphenylene sulfide resin composition of claim 1, wherein said composition consists essentially of said polyphenylene sulfide, said polyphenylene ether, said polyamide, said hydrogenated conjugated diene compound/aromatic vinyl compound block copolymer, said modified polyolefin, said compatibilizer, and said inorganic filler.

5. The polyphenylene sulfide resin composition of claim 1, wherein said composition consists of said polyphenylene sulfide, said polyphenylene ether, said polyamide, said hydrogenated conjugated diene compound/aromatic vinyl compound block copolymer, said modified polyolefin, said compatibilizer, and said inorganic filler.

* * * * *